(12) United States Patent
Jackson et al.

(10) Patent No.: US 11,772,406 B2
(45) Date of Patent: Oct. 3, 2023

(54) PRINTABLE UNCLONABLE FUNCTION PATTERNS

(71) Applicants: PALO ALTO RESEARCH CENTER INCORPORATED, Palo Alto, CA (US); XEROX CORPORATION, Norwalk, CT (US)

(72) Inventors: Warren Jackson, San Francisco, CA (US); Janos Veres, San Jose, CA (US); Yujie Zhu, Mississauga (CA); Jennifer L. Belelie, Oakviille (CA); Robert A. Street, Palo Alto, CA (US); Ping Mei, San Jose, CA (US); Kent Evans, Cupertino, CA (US)

(73) Assignee: XEROX CORPORATION, Norwalk, CT (US)

( * ) Notice: Subject to any disclaimer, the term of this patent is extended or adjusted under 35 U.S.C. 154(b) by 185 days.

(21) Appl. No.: 17/157,652

(22) Filed: Jan. 25, 2021

(65) Prior Publication Data
US 2022/0234378 A1 Jul. 28, 2022

(51) Int. Cl.
G06K 19/06 (2006.01)
B42D 25/29 (2014.01)
B29C 64/118 (2017.01)
B29C 64/153 (2017.01)
B42D 25/405 (2014.01)
B42D 25/378 (2014.01)
B33Y 80/00 (2015.01)
B33Y 30/00 (2015.01)
B33Y 70/10 (2020.01)

(52) U.S. Cl.
CPC ............ B42D 25/29 (2014.10); B29C 64/118 (2017.08); B29C 64/153 (2017.08); B42D 25/378 (2014.10); B42D 25/405 (2014.10); B33Y 30/00 (2014.12); B33Y 70/10 (2020.01); B33Y 80/00 (2014.12)

(58) Field of Classification Search
CPC ..... B29C 64/118; B29C 64/153; B33Y 30/00; B33Y 70/10; B33Y 80/00; B42D 25/29; B42D 25/378; B42D 25/405; C12N 15/113; C12N 2310/11; C12N 2310/14; C12N 2310/20; C12N 2310/531; C12N 2320/12; F24F 11/30; G01C 21/206; G06Q 10/06; G08B 21/02; G08B 7/066; G16B 20/30; G16B 20/50; G16B 25/10; H05B 47/10; H05B 47/11; H05B 47/115; H05B 47/175; Y02B 20/40
See application file for complete search history.

(56) References Cited

U.S. PATENT DOCUMENTS 7,780,878 B2 * 8/2010 Young ...................... H01B 1/16
                                                    252/514
10,899,160 B1 * 1/2021 Jones ................... B42D 25/328
(Continued)

Primary Examiner — Thien M Le
(74) Attorney, Agent, or Firm — Miller Nash LLP

(57) ABSTRACT

A print feedstock has a base material and a marker material, the base material and the marker material having different physical properties. A system to validate objects includes at least one printer to print feedstock onto an object, the feedstock comprising a base material and a marker material, the base material and a marker material having different properties, a device to create a unique identifier for the object based upon a pattern of the feedstock, and a store in which the unique identifier can be stored.

21 Claims, 5 Drawing Sheets

(56) References Cited

U.S. PATENT DOCUMENTS

| | | | | |
|---|---|---|---|---|
| 2002/0065853 A1* | 5/2002 | Takahashi | .............. | G06Q 10/10 |
| | | | | 715/274 |
| 2005/0005122 A1* | 1/2005 | Abraham | ......... | G06K 19/06009 |
| | | | | 713/176 |
| 2006/0167147 A1* | 7/2006 | Asgari | ................. | A61K 9/5138 |
| | | | | 524/265 |
| 2006/0189716 A1* | 8/2006 | Ushirogouchi | ...... | C09D 11/101 |
| | | | | 523/160 |
| 2010/0112314 A1* | 5/2010 | Jiang | .................... | C09D 11/50 |
| | | | | 428/199 |
| 2014/0028011 A1* | 1/2014 | Yamauchi | .............. | B42D 25/47 |
| | | | | 283/74 |
| 2017/0125909 A1* | 5/2017 | Pance | .................. | H01Q 9/0485 |
| 2017/0125910 A1* | 5/2017 | Pance | .................. | H01Q 9/0485 |
| 2019/0210399 A1* | 7/2019 | Motz | ...................... | B05D 5/061 |
| 2020/0338809 A1* | 10/2020 | Raillard | ................ | B29C 64/393 |
| 2020/0408616 A1* | 12/2020 | Berkland | ............. | C09D 11/037 |
| 2021/0370605 A1* | 12/2021 | Raillard | ................ | G04B 19/12 |

\* cited by examiner

PRINTABLE UNCLONABLE FUNCTION PATTERNS

TECHNICAL FIELD

This disclosure relates to a unique marking for print substrates, more particularly physical unclonable functions.

BACKGROUND

A need exists to securely and uniquely mark and identify printed documents, packaging medium including boxes, labels, envelopes, etc., and 3D printed objects. Physical unclonable functions (PUFs) generally comprise items that are easy to fabricate and to sense or detect, but very difficult and costly to duplicate. PUFs can prevent counterfeiting, prevent substitution of parts in an assembly, ensures proper custodianship and ownerships, and serve as an uncopiable digital signature.

Current approaches use unique markers that may carry a special optical signature, such as absorption or luminescence at certain wavelengths or combination of wavelengths. Such markers may be printed on banknotes such as a vertical infrared absorbing band. Markers may also be distributed across the surface of volume of objects such as optical markers like TruTag®, which have found applications by spraying onto packaging or in through the volume of pills.

SUMMARY

According to aspects illustrated here, there is provided a print feedstock having a base material and a marker material, the base material and the marker material having different physical properties.

According to aspects illustrate here, there is provided a system to validate objects including at least one printer to print feedstock onto an object, the feedstock comprising a base material and a marker material, the base material and a marker material having different properties, a device to create a unique identifier for the object based upon a pattern of the feedstock, and a store in which the unique identifier can be stored.

DETAILED DESCRIPTION OF THE EMBODIMENTS

The embodiments provide a unique identifier in the form of a physical unclonable function (PUF) resulting from a printing process. The process makes it simple to fabricate and sense the PUF, but makes duplication difficult and/or costly. The embodiments here provide a printing process that can generate a PUF detectable by scanning, compatible with existing printing and scanning systems.

As used here, the term "feedstock" means a source of material used in a printing process. Printing processes may include electrophotography, ink jet printing, additive manufacturing in the form of 3D printing, such as "fused deposition Modeling®," known more generally as fused filament fabrication, and selective laser sintering, and may employ toners, inks, powders, pellets or filaments, etc.

By altering the composition of the feedstock, the printed pattern that may include text, images, bar codes, etc., becomes a unique identifier. The alteration of the feedstock introduces random patterns into the printed pattern that becomes the PUF. The resulting pattern, when scanned, becomes a unique identifier for the item upon the pattern resides. As mentioned above, the term "pattern" as used here means any printed image, text, combination, bar code, etc.

A scanning device captures the pattern for storage, as discussed in more detail later. The pattern will have some detectable physical characteristic, such as a different optical, electrical or mechanical characteristics, that becomes apparent when scanned. Scanning may involve optical scanning including photographs, mechanical testing or stressing the pattern, or applying an electric field to the pattern. In some embodiments the scanning device may consist of a smartphone or camera. In some embodiments, the scanning device that produces the unique identifier from the PUF may also act as a reader to produce a copy of a unique identifier for an object and then compare it to the original identifier for the object, as will be discussed in more detail later.

Altering the feedstock to allow for the random generation of patterns may take many forms. The feedstock will generally comprise a base material, such as ink, toner, etc., and a marker material that has a different physical property that the base material. The marker material may be mixed into the base material, such as toner or ink, in a much smaller percentage of the overall composition of the feedstock. This provides a random dispersion into the base material that will reflect in the printed pattern.

One embodiment disperses particles into the ink as the marking material. These particles may comprise nanoparticles, metal particles, quantum dots, etc. The marking material may have a smaller size than the resolution of the print resolution, leading to a highly unique pattern difficult, or even impossible, to replicate.

Figure 1:
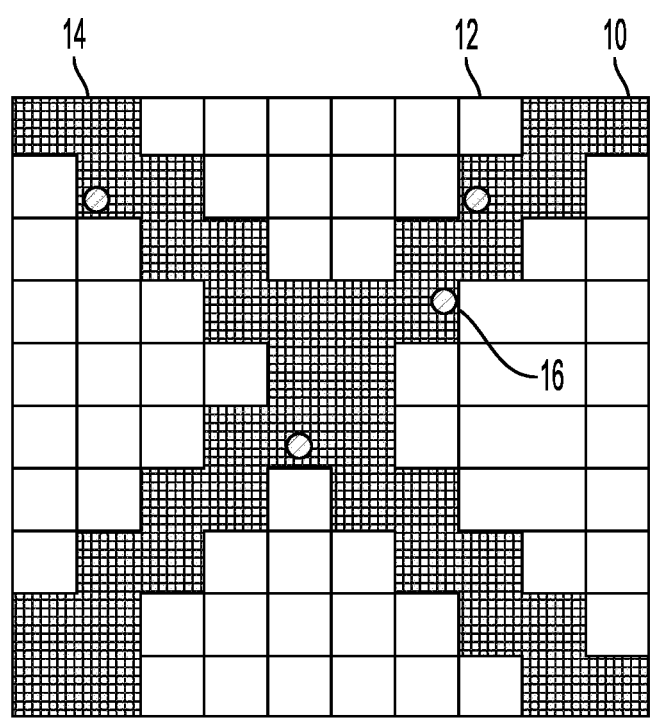
FIG. 1 shows an embodiment of a printed PUF having a unique pattern of a different material.

FIG. 1 shows an embodiment of an optical pattern 10. The pattern 10 comprises pixels, which are regions of the overall pattern in which ink or toner either resides, such as in 14, or that are blank, such as 12. Within the printed pixels, particles such as 16, form a unique pattern within the printed pattern. This pattern, formed of random dispersions of the particles in the base material, when scanned will form the unique identifier for the object upon which it resides.

Generally, the use of particles in a feedstock may allow for different levels of scanning. A first level scanning may occur at the resolution of the image to detect the arrangement of the marker detectable by a conventional scanning or image process. For higher security authentication, a second level scan may detect the locations of the particles within the pixels using either higher resolution, a slower scan speed, or multiple capture cycles.

In addition to mixing particles into the base material, some embodiments can mix different print materials together. The term print materials as used here means the material that forms the pattern. These may include toner, liquid ink, dry transfer material, sublimation material, filaments or pellets that melt, solid wax or ink that melts, etc. One embodiment may mix two or more different types of different pigments of a same type of print material.

For example, two different pigments of a color may mix together. When printed, they appear to be the same color, but when illuminated or scanned, the difference may become apparent. An exemplary embodiment may comprises a formulation of 90-99.9% of a first black toner using carbon black, and a second batch of black toner based upon pigment black 60. This results in a random underlying pattern in the final print. The marker particles would be less than 10% of the pixels, or even less than 1%.

Another embodiment may involve doping one of the batches with a covert optical marker that reacts when scanned. These may include luminescent, phosphorescent, or absorbing materials.

In another embodiment, the base material may have a marker and the marker material has none. Essentially, the marker material becomes a 'negative' marker, where the pattern comprise areas of no marker caused by the presence of the marker material.

In embodiments for 3D printing, the process may integrate the markers in several ways. For select laser sintering, in which a layer of powder is sintered with a laser to form an object layer by layer, two types of powders could be mixed together. The base material would take the form of a 'pure' powder, essentially a stock or otherwise standard powder. The marker material may comprise a powder in which a marker exists on every particle, or the particles are themselves a marker. The different marker powders could comprise a different metal alloy than the usual sintering powder, a polymeric or organic particle, an inorganic particle and combinations of these. The different particles may have a different physical property than the others, resulting in a detectable pattern when exposed to heat, light, an electric field or a magnetic field.

In fused filament fabrication, the filaments may contain a random distribution of markers in the filaments during the extrusion process. The process may achieve this by using two different types of pellets during the melt process to create the filament. Alternatively, the system may also have a valve or other means to introduce a marker material that can be added and turned off at random times.

Another set of embodiments involve a phase segregation system. For example, a block copolymer could be dissolved in theta solvents. Upon printing or coating onto a substrate, the copolymers could segregate into a unique pattern.

Figure 2:
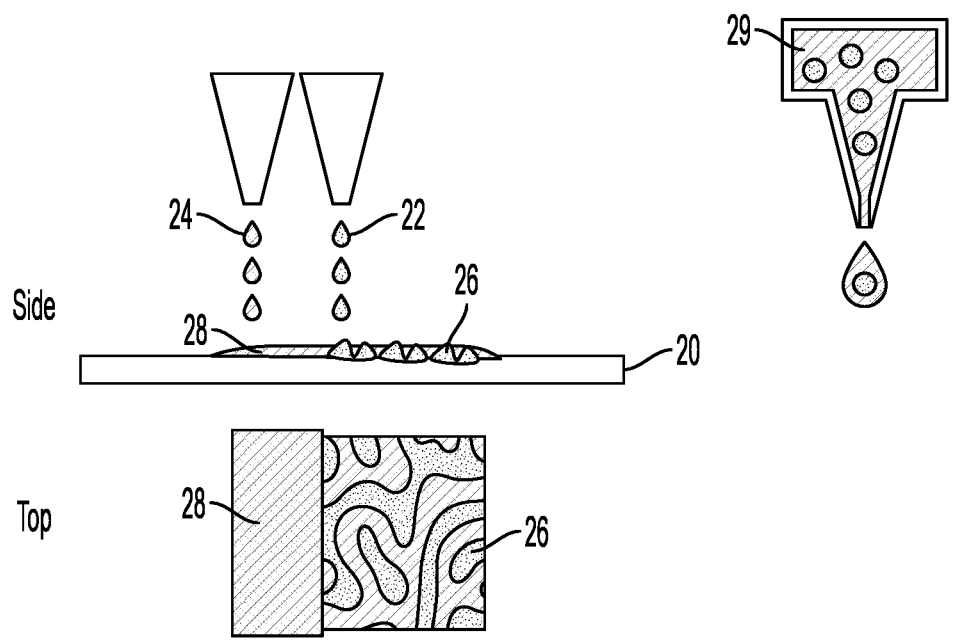
FIG. 2 shows an embodiment of a printed PUF using immiscible liquids.

FIG. 2 shows an embodiment of this type of system. The system employs immiscible compounds, meaning compounds that do not mix, such as a combination of an oil, an aqueous ink, and a surfactant such as a detergent. This promotes small complex vesicles of ink. As shown in FIG. 2, the system deposits the ink 24 and another type of liquid, immiscible with the ink, 22, on to the substrate 20. As seen in the side view above, or the top view below, the ink forms a region 28 and the immiscible liquid mixed with the ink forms a patterned region 26 that makes a unique pattern. The system could jet these liquids separately as shown on the left, or pre-mixed and jetted from one jet 29 shown on the right.

These types of systems may involve a print feedstock having two layers, one of the base material and the other a marker material. The marker material may comprise a material that interacts with the base material to form a random pattern that will make up the unique identifier. The base material would be the first layer and the marker material would be the second layer.

In one embodiment, the first layer may comprise a base polymer monomer, such as silicones, resins, one part of a two part epoxy, etc. The second layer could then be a crosslinker, catalyst, initiator, second part of a two part epoxy, etc. The second layer, when in contact with the first layer, causes the first layer to form a unique pattern. The second layer may be activatable, such as by application of heat, even just room temperature, under UV light, etc.

Figure 3:
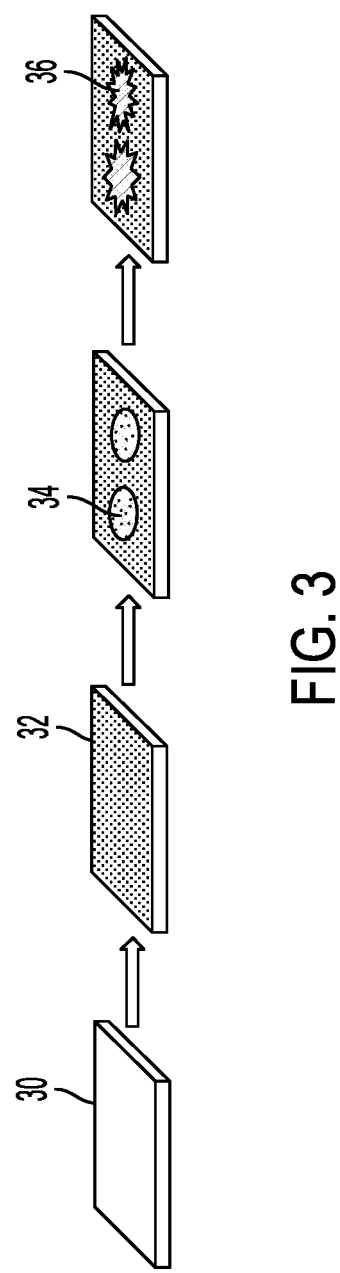
FIG. 3 shows an embodiment of two-layer PUF process.

In another embodiment, the two layer embodiment may involve at first layer with random nucleation sites or pinning point. A nucleation site occurs at an area of a material where a phase change occurs, and a pinning point is an area in a material where a dislocation occurs. Application of a second layer can form patterns around these points that can make up the identifier. FIG. 3 shows an example of this type of embodiment.

In FIG. 3, a substrate is provided. The substrate 30 may comprise a print surface or a label upon which the PUF that will ultimately become the unique identifier. The process would deposit a first layer 32. Typically the first layer would comprise the base material and the second layer would comprise the marker material, although the reverse could also be true. The process will then deposit the second layer 34. This will then cause the second layer to form a unique pattern at 36.

However the PUF is formed, it has unique detectable physical properties. The term "physical property" as used here means a physical property of the printed pattern itself, not the pattern itself. For example, the pattern may be a word or image, which has no relevance to the physical property. The different properties include properties that are detectable by the sensor, however configured.

The physical properties may have one of several modes. In one embodiment, the physical properties may be optical. The base material and the marking material may have different optical properties. For example, they may have different light absorption properties, may luminesce differently, and may have different phosphorescent properties when exposed to light. The light may be UV, infrared, or anywhere on the spectrum. The markers may 'sparkle' or otherwise form a pattern when exposed to light, as an example. Quantum dots, metal or other inorganic nanoparticles would more than likely exhibit this behavior. In the case of photochromic, the optical properties differences may become apparent in the presence of heat.

In one mode, the physical properties may be electrical in nature. The marker material may be a conductive, semiconductive, or polarizable particles or molecules, including liquid crystalline material, electrochromic or electrophoretic. The polarization of the crystalline materials, the color of the material or the electrophoretic response may change with application of an electric field or current. An example of this in conjunction with a self-validation process is discussed in more detail below.

In another embodiment, the physical property may be magnetic, where the pattern would be detectable with a magnetic sensor such as a Hall sensor or an inductive head.

Figure 4:
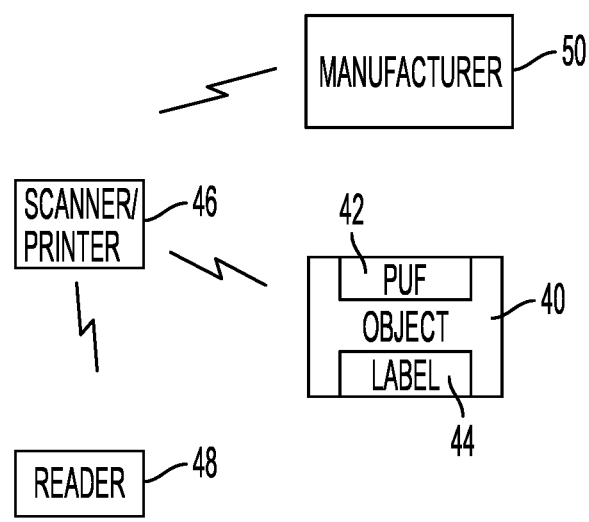
FIG. 4 shows embodiments of different types of validation systems.

A common use of the PUFs is in validating the objects upon which the PUF is printed. Embodiments of validation system may comprise a self-validating system, a remote validation system, and a system with manufacture validation. FIG. 4 shows different components that may exist in these systems, all or in part.

As used here, a self-validating system means a system in which no remote communication is required for validation, either to a central system or a manufacturer 50. In one embodiment, the self-validation occurs when the PUF is imaged or scanned to create a unique identifier in the system. In this discussion, the PUF is the printed pattern and the identifier is the resulting electronic form of the PUF, such as an image, or pattern, or electrical response, etc. In the self-validating case, the unique identifier is then attached to the object upon which the PUF resides. This may take the form of a QR code, or other way of capturing the unique identifier that allows a reader 48 to extract the unique identifier.

In one embodiment, the object 40 has the PUF pattern 42. This is then scanned by the scanner, which may also comprise the printer that prints the PUF 46, either optical, electrical or mechanical, to generate the unique identifier derived from the PUF. The printer and scanner here are shown as one device but may be separate devices. In the self-validating embodiment above, the unique identifier would be encoded and returned to the object 40, as a label or some other way to capture the identifier.

Figure 5:
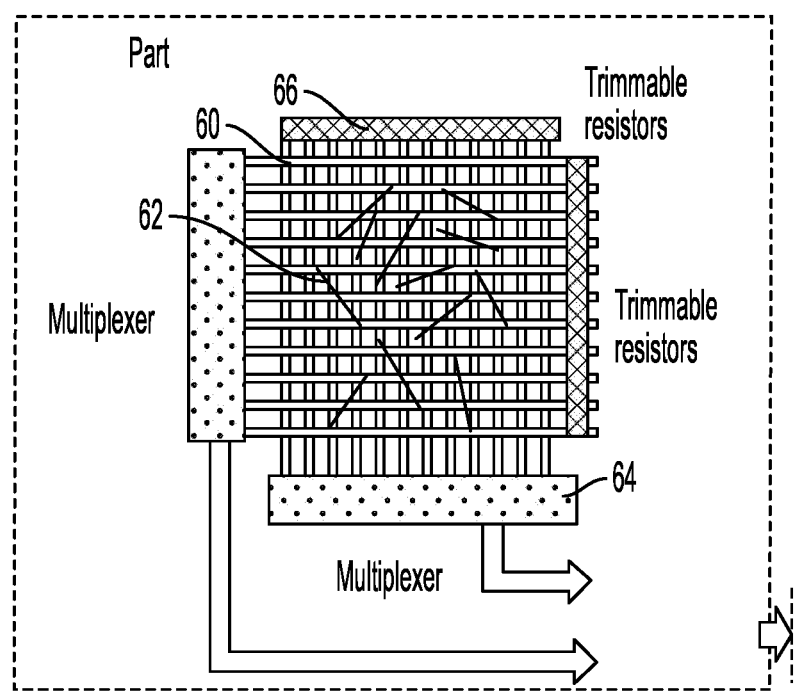
FIG. 5 shows an embodiment of a self-validation, electronic PUF.

In one embodiment, shown in FIG. 5, the PUF may take the form of a conductive grid 60 upon which a solution of conductive fibers 62, such as carbon fibers, carbon nanotubes, etc., is printed. The conductive grid may take the form of an active matrix, or various cross overs. Upon application of voltages, the output of the multiplexers such as 64 results in a random pattern of resistances. The unique identifier in the form of resistances can be captured in an array of trimmable resistors 66 by trimming them to yield certain random but desired values. On the authentication side, the system would use the same random patterns to measure the resistances and compare them to the stored values. In this embodiment, the scanning would comprise measuring the resistances and creating the unique identifier would be generating the appropriate resistances.

On the validation side, a reader, which may or may not be part of the scanner/printer, would then scan the PUF and create the unique identifier. This can then be compared to the stored unique identifier to confirm that the object is authentic.

In the self-validation case, the stored identifier resides on the object itself. In other systems, the stored unique identifier derived from the PUF would reside elsewhere. In this instance, the reader may be a terminal with less processing power that only needs to scan the PUF and generate the identifier. The identifier is then handed off to a remote system in which the original identifier can be accessed and compared to the "copy" of the original identifier to authenticate the object.

In a different type of remote authentication system, the manufacturer generates the unique identifier from the PUF on the object. When authentication is needed, the party that needs validation scans the PUF and creates a copy of the identifier. The party then sends the PUF to the manufacturer or the manufacturer provides the PUF to the party. The two are compared to authenticate the object.

In this manner, one can provide a means to authenticate an object. The embodiments above serve as examples of the embodiments and are not intended to limit the scope of the invention as claimed. Other variations and modifications exist. The objects may undergo bulk processing to add these PUFs to the objects. While the various printing processes above are examples of printing processes, and other processing may include spray coating, slot die coating or molding, and random distribution of markers.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A print feedstock having a base material in a first layer and a marker material in a second layer, the base material and the marker material having different physical properties, the marker material selected to interact with the base material to cause the base material to form a random, detectable, pattern in the first layer.

2. The feedstock as claimed in claim 1, wherein the base material is one of toner, ink, powder, filament, polymer, or monomer.

3. The feedstock as claimed in claim 2, wherein the marker material is one of toner or ink that differs from the base material.

4. The feedstock as claimed in claim 2, wherein the marker material has a different type of pigment with different optical properties than the base material that appears similar to an unaided eye.

5. The feedstock as claimed in claim 2, wherein the marker material is a liquid immiscible in the base material.

6. The feedstock as claimed in claim 1, wherein the marker material comprises discrete particles dispersed in the base material.

7. The feedstock as claimed in claim 1, wherein the base material has a marking component and the marker material is free of marking components.

8. The feedstock as claimed in claim 1, wherein the base material comprises a powder for use in selective laser sintering and the marker material comprises a powder different from the base material.

9. The feedstock as claimed in claim 1, wherein the base material is a filament used in fused filament fabrication manufacturing and the marker material is one of a different filament or controllably dispensed additive.

10. The feedstock as claimed in claim 1, wherein the base material contains one or more polymers or monomers and the marker material comprises one or more of crosslinkers or catalysts.

11. The feedstock as claimed in claim 1, wherein the base material comprises a base layer having one of either random nucleation sites or random pinning sites and the marker material comprises a layer of phase segregation material that either avoids or bonds to the nucleation or pinning sites.

12. The feedstock as claimed in claim 1, wherein the different physical properties are optical.

13. The feedstock as claimed in claim 12, wherein the optical properties are one of absorption, reflectance, luminescence, phosphorescent, and photochromic.

14. The feedstock as claimed in claim 1, wherein the physical properties are mechanical.

15. The feedstock as claimed in claim 1, wherein the physical properties are electrical.

16. The feedstock as claimed in claim 15, wherein the electrical properties are impedance, electrochromic, and electrophoretic responses in the presence of an electrical field.

17. A system to validate objects, comprising
at least one printer to print feedstock onto an object, the feedstock comprising a base material in a first layer and a marker material in a second layer, the base material and a marker material having different properties, the marker material selected to interact with the base material to cause the base material to form a detectable random pattern in the first layer;

a device to create a unique identifier for the object based upon the random pattern of the feedstock; and a store in which the unique identifier can be stored.

18. The system as claimed in claim 17, wherein the store comprises a code attached to the object for self-validation.

19. The system as claimed in claim 17, wherein the store comprises a store located in a remote system.

20. The system as claimed in claim 17, wherein the remote system resides at a site of a manufacture of the object.

21. The system as claimed in claim 17, wherein the remote system resides at a site of an authenticating party.

\* \* \* \* \*